United States Patent [19]
Xu et al.

[11] Patent Number: 6,014,245
[45] Date of Patent: Jan. 11, 2000

[54] ACOUSTO-OPTIC TUNABLE FILTER SYSTEM WHICH RADIATES A SOURCE LIGHT BEAM INCIDENT ON A SURFACE OF THE CRYSTAL FILTER BODY AT AN OBLIQUE ANGLE

[75] Inventors: Kexin Xu; Hiroshi Yamamoto, both of Kyoto, Japan; Bin Xue, Tiajin, China

[73] Assignee: Kyoto Daiichi Kagaku Co., Ltd., Kyoto, Japan

[21] Appl. No.: 08/997,854

[22] Filed: Dec. 24, 1997

[30] Foreign Application Priority Data

Dec. 25, 1996 [JP] Japan .................................. 8-345120

[51] Int. Cl.[7] ........................................................ G02F 1/11
[52] U.S. Cl. ............................................. 359/285; 359/305
[58] Field of Search ....................................... 359/285, 308, 359/309, 313, 314

[56] References Cited

U.S. PATENT DOCUMENTS 5,841,577  11/1998  Wachman et al. ....................... 359/308

Primary Examiner—Huang Xuan Dang

[57] ABSTRACT

In a non-collinear type acousto-optic tunable filter, a source light beam is made off-perpendicularly incident on a crystal body, so that the cross section of the source light beam is narrowed within the crystal body. As a result, the receiving angular aperture becomes large to increase the amount of light collected into the crystal body. Consequently, highly accurate spectrometry can be performed even if the intensity of the source light beam is low. Further, the non-diffraction part of the crystal body can be eliminated by the off-perpendicular incidence of the source light beam, so that the sufficient diffraction length of acoustic and optic waves can be obtained.

12 Claims, 10 Drawing Sheets

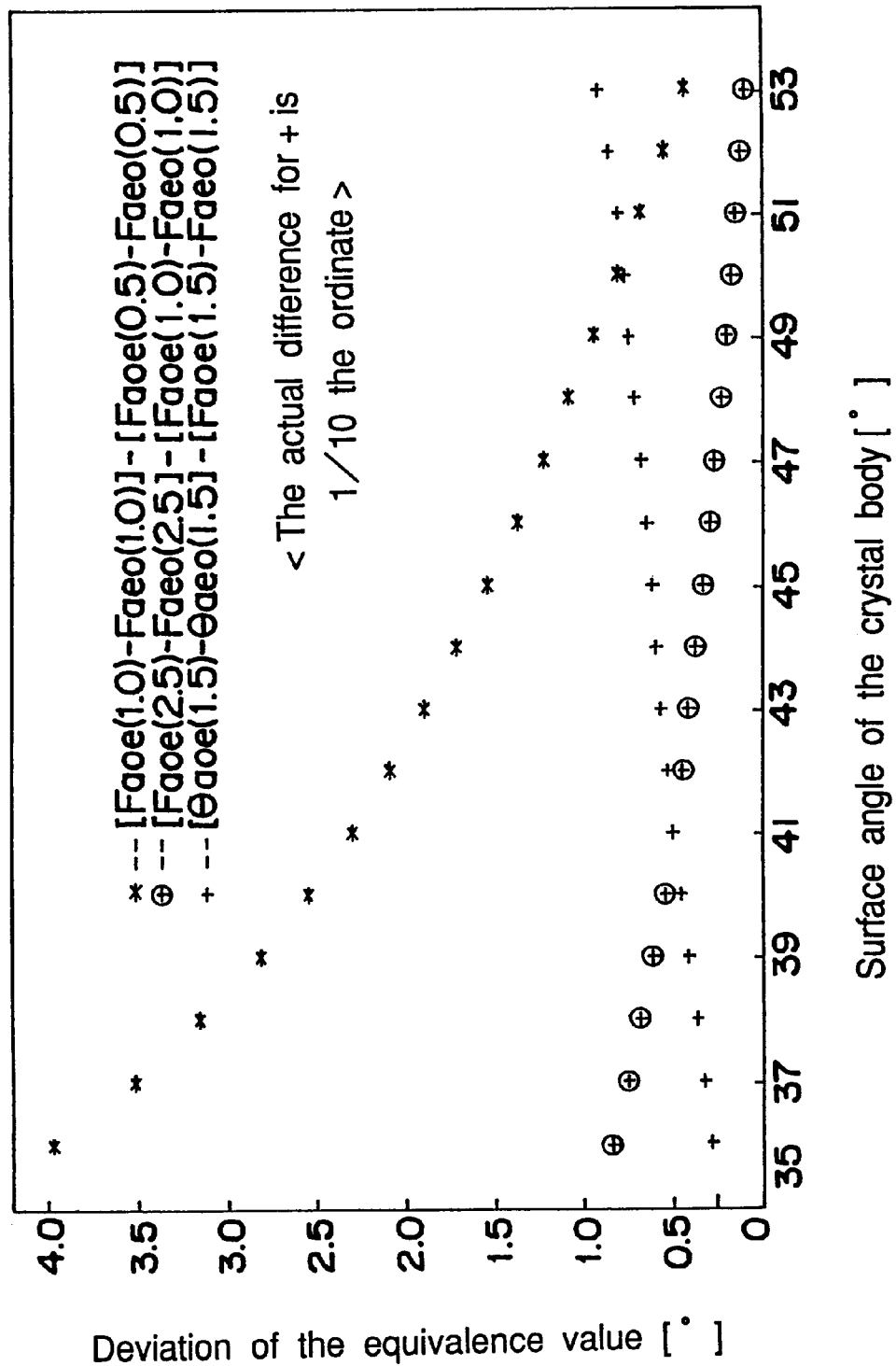

ACOUSTO-OPTIC TUNABLE FILTER SYSTEM WHICH RADIATES A SOURCE LIGHT BEAM INCIDENT ON A SURFACE OF THE CRYSTAL FILTER BODY AT AN OBLIQUE ANGLE

BACKGROUND OF THE INVENTION

1. Field of the Invention

The present invention relates to an acousto-optic tunable filter in which a source light beam is incident on the surface of a crystal body at an oblique angle.

2. Description of the Prior Art

In general, spectroscopes, spectrophotometers and the like are used in spectroscopy to obtain a spectrum by measuring the intensity of a source light beam in different wavelength regions. Prism spectroscopes and diffraction grating spectroscopes have been widely used for such a purpose. However, the acousto-optic tunable filter, abbreviated as AOTF, has spread recently, because of its high-speed and a seismic processing. In the AOTF, an acoustic wave is applied to a crystal body consisting in a uniaxial crystal material such as a tellurium dioxide ($TeO_2$) crystal. At the same time, a source light beam is radiated onto the crystal body to obtain a particular wavelength component of the source light beam as a diffracted ray diffracted within the crystal body. Here, the wavelength of the diffracted light is determined by the frequency of the applied acoustic wave, so that the spectrum of the source light beam is obtained by varying the frequency of the acoustic wave and by continuously measuring the intensity of the diffracted ray using a photometer.

The history of the development and advances of the AOTF in recent years is as follows. In 1967, a collinear type was first realized for practical use. Here, the direction in which the acoustic wave travels is the same as the direction in which the light beam travels. However, the most practical and useful AOTFs were not realized until I. C. Chang discovered that $TeO_2$ is an almost ideal crystal material for manufacturing the AOTF and a non-collinear type AOTF was proposed. In the non-collinear type AOTF, the direction in which the acoustic wave travels intersects with the direction in which the light beam travels. During the past 20 years, hundreds of patents and papers have been disclosed, but almost all of these research and development works are based on early theoretical contributions of I. C. Chang, T. Yano, and A. Watanabe, in which momentum matching and phase matching conditions are commonly accepted.

In the early theoretical research and development, physical models for the AOTF were perfect, but the mathematical analysis always depended on approximation methods. In 1985, Mo Fuqin proposed, for the first time, an accurate mathematical description about the parallel-tangent condition. In 1987, Epikhin gave a general system of equations that represent accurate relationships between acoustic parameters and optical parameters. This is one of the greatest contributions to AOTF design. In 1991, Gass set the acoustic wavevector angle at −80.23° for no particular reason to calculate optimal parameters for the system. In 1992, Ren Quan almost entirely followed the analytic method of Gass's paper and set the acoustic wavevector angle at 105° to calculate a set of parameters for this particular acoustic wavevector angle.

As described above, the AOTF has rapidly spread and progressed in recent years, but a number of problems to be solved remain with prior AOTFs. One of the problems is as follows.

In a prior AOTF, if the intensity of the source light beam is low, or if the intensity of the components of the source light beam in a wavelength region is low, then the accuracy of spectrometry or the accuracy of the finally obtained spectrum becomes low. For example, in the spectral analysis of measuring the absorption spectrum of an object, it is required to accurately measure the intensity of the light in a wavelength region that is absorbed by the object, but the light intensity is often low in the wavelength region due to absorption. Therefore, there has been a problem that the accuracy of the spectral analysis becomes low if an AOTF is used.

In the case where an AOTF is used in a spectroscopic system in which the incident light is weak, the receiving angular aperture becomes an important parameter that determines the accuracy of spectroscopy. As the receiving angular aperture becomes larger, a higher amount of incident light can be collected, so that a higher S/N ratio can be obtained. As proposed by Mo Fuqin, Epikhin, and others, the conservation-of-momentum condition or the parallel-tangent condition has been used in the techniques of determining the position of the crystal body in the AOTF of recent years. In the AOTF designed by using the parallel-tangent condition, an optimal receiving angular aperture can be obtained. The present inventors found through general mathematical analysis that the receiving angular aperture can be set approximately at a maximum value under the conservation-of-momentum condition and the parallel-tangent condition. Further, the present inventors found an optic equivalence incident angle for which the wavelength of the diffracted ordinary ray and the diffracted extraordinary ray becomes identical for an identical acoustic frequency. However, there is still a problem that the receiving angular aperture is not sufficiently large, even if the receiving angular aperture is such an optimal or maximum value.

In a prior AOTF, the source light beam is made perpendicularly incident on the surface of the crystal body (normal incidence). However, there occurs, within the crystal body, a part that is irrelevant of the propagation of the acoustic wave in such an AOTF. This part, called non-diffraction part, becomes greater, as the optic incident angle, which is defined as the angle between the optic axis of the crystal body and the optic axis of the source light beam in the crystal body, is set at a greater value. In fact, when the crystal body is cut in a shape so that the source light beam should be perpendicularly incident on the crystal body surface, the shape has to completely cover the part in which the acoustic wave propagates and also the crystal body surface has to be perpendicular to the optic axis of the source light beam. Therefore, the shape inevitably becomes greater than the shape of the part in which the acoustic wave propagates, so that there occurs within the crystal body a non-diffraction part (idle part) that is irrelevant of the propagation of the acoustic wave.

If the optic incident angle is set at the equivalence incident angle, and the receiving angular aperture is set at a maximum value, then the ratio of the non-diffraction part within the crystal body becomes very large, since the equivalence incident angle is significantly large (for example, about 56° for $TeO_2$). In this case, if a uniaxial crystal material of the same volume as in the prior AOTF is used, then the propagation part of the acoustic wave becomes small. Therefore, the diffraction length of the acoustic and optic waves becomes short in this case, so that spectral resolution deteriorates. If the diffraction length of the acoustic and optic waves is sufficiently maintained, then the volume of the uniaxial crystal material becomes large, so that the manufacturing cost of the AOTF becomes high.

SUMMARY OF THE INVENTION

The present invention has been therefore devised to solve the above problems. Its object is on one hand to provide an AOTF that performs accurate spectrometry even if the intensity of the source light beam or the intensity of the components of the source light beam in a wavelength region is low. The object is at the same time to provide an AOTF in which the diffraction length of acoustic and optic waves is sufficiently maintained without substantially increasing the volume of the uniaxial crystal material.

According to the present invention, in a non-collinear type AOTF having a crystal body formed of an optically transparent uniaxial crystal material, an acoustic wave application member that applies an acoustic wave of an arbitrary wavelength to the input surface for acoustic waves of the crystal body, such that a source light beam radiated from a light source and incident on the crystal body intersects with the acoustic wave propagating within the crystal body, so that wavelength components, corresponding to the acoustic frequency, of the incident ordinary ray and the incident extraordinary ray are diffracted within the crystal body and respectively separated into a monochromatic diffracted extraordinary ray and a monochromatic diffracted ordinary ray, the acousto-optic tunable filter is characterized in that the source light beam having a predetermined receiving angular aperture is off-perpendicularly incident on the surface of the crystal body at a predetermined source light incident angle between 0° and 90°, where the source light incident angle is defined as the angle between the crystal surface normal and the optic axis of the source light beam.

Here the uniaxial crystal material is preferably a $TeO_2$ crystal.

In this AOTF, the source light incident angle is set at an angle greater than 0° and less than 90°, so that the source light beam is off-perpendicularly incident on the surface of the crystal body. Here, if the source light beam of a cone shape with a circular cross section is off-perpendicularly incident on the surface of the crystal body, then the cross section becomes elliptic by narrowing at a predetermined direction. This phenomenon is hereafter called a beam narrowing phenomenon. This beam narrowing phenomenon occurs owing to the fact that the refractive index in the predetermined direction and the refractive index in the direction perpendicular to that direction are different. The beam narrowing phenomenon becomes greater as the source light incident angle becomes greater. The beam narrowing phenomenon depends on the polarization state and the wavelengths of the light beam as well as the source light incident angle. Using this beam narrowing phenomenon, the receiving angular aperture can be large, so that the amount of collected light in the crystal body can be large. Therefore, spectrometry can be performed with high accuracy, even if the intensity of the source light beam or the intensity of the components of the source light beam in a wavelength region is low.

In the present AOTF, the source light beam is made off-perpendicularly incident on the surface of the crystal body, so that if the source light incident angle is properly set, it is not necessary to have a non-diffraction part of the crystal body in order to make the source light beam perpendicularly incident on the surface of the crystal body as in a prior AOTF. Therefore, the crystal body can be cut into a shape almost the same as or slightly larger than the part in which the acoustic wave propagates. This part is called the diffraction part hereafter. Therefore, the non-diffraction part, that is, the idle part irrelevant of the propagation of the acoustic wave is almost non-existent. Therefore, sufficient diffraction length of the acoustic and optic waves can be obtained without a substantial increase in the volume of the used crystal material. Therefore, the degree of effective use of the crystal material is increased, so that an AOTF of high spectral resolution and low cost can be obtained.

According to experiments and analysis of the present inventors, the source light incident angle is preferably set at an equivalence value for which the wavelength of the diffracted ordinary ray and the wavelength of the diffracted extraordinary ray become identical for an identical acoustic frequency. If the source light incident angle is set at the equivalence value, then the receiving angular aperture can be further enlarged, so that the amount of light collected in the crystal body is further increased, and the accuracy of spectroscopy is further enhanced.

According to experiments and analysis of the present inventors, the equivalence incident angle of the AOTF using a $TeO_2$ crystal in perpendicular incidence is approximately 56°. However, the equivalence incident angle depends on the wavelength of the diffracted rays. The equivalence incident angle becomes greater as the wavelength increases at the wavelength range of 0.5 $\mu$m to 2.5 $\mu$m.

In the AOTF in which the source light incident angle is the equivalence value, the surface angle of the crystal body, defined as the angle between the crystal surface normal and the optic axis of the source light beam, is preferably set at a predetermined angle, for example 40°, for which the equivalence value is large and weakly depends on the wavelength of the diffracted rays. In this way, in the case where the source light incident angle is set at the equivalence value, the source light incident angle becomes greater, as the surface angle of the crystal body becomes smaller. Therefore, the degree of effective use of the beam narrowing phenomenon and crystal body is enhanced in this case. However, at the same time, as the surface angle of the crystal body becomes smaller, the dependency of the equivalence value on the wavelength of the diffracted rays becomes greater. Therefore, in this case, it becomes harder to make identical the wavelengths of the diffracted ordinary ray and the diffracted extraordinary ray.

On the other hand, when the surface angle of the crystal body is great, the dependency of the equivalence value on the wavelength of the diffracted rays is small. However, the source light incident angle becomes small in this case, so that the degree of effective use of the beam narrowing phenomenon and crystal body declines.

In other words, if the surface angle of the crystal body is too small, then the equivalence value is hard to obtain. If the surface angle of the crystal body is too large, then the degree of effective use of the beam narrowing phenomenon and crystal body becomes low. In order to solve this dilemma, the surface angle of the crystal body is preferably set at an angle, for example around 40°, for which the equivalence value is comparatively large and its dependency on the wavelength of the diffracted rays is comparatively small.

In the present AOTF, the dependency of the equivalence incident angle on the wavelength of the diffracted rays is smaller as the wavelength of the diffracted rays is longer. Therefore, the source light is preferably of long wavelength, for example near infrared light.

Further, in the present AOTF, the surface of the crystal body is preferably parallel to the direction in which the energy of the acoustic wave flows. In this case, the shape of the crystal body becomes almost the same as the diffraction part, in which the acoustic wave propagates, so that the non-diffraction part, that is, the idle part irrelevant of the propagation of the acoustic wave, of the crystal body becomes almost non-existent. Therefore, the volume of the uniaxial crystal material is reduced, while the diffraction length of acoustic and optic waves is sufficiently obtained.

In the present AOTF, the surface of the crystal body is preferably coated so that the transmittance of the light from the outside of the crystal body into the crystal body should be enhanced.

BRIEF DESCRIPTION OF THE DRAWINGS

These and other objects and features of the present invention will become clear from the following description taken in conjunction with the accompanying drawings throughout which like parts are designated by like reference numerals, and in which:

FIG. 13 is a graph illustrating the deviation of the equivalence value of the source light incident angle depending on the surface angle of the crystal body due to different methods of computation and the optic wavelength.

DETAILED DESCRIPTION OF THE PREFERRED EMBODIMENT

A preferred embodiment according to the present invention will be described below in conjunction with the attached drawings.

Figure 1:
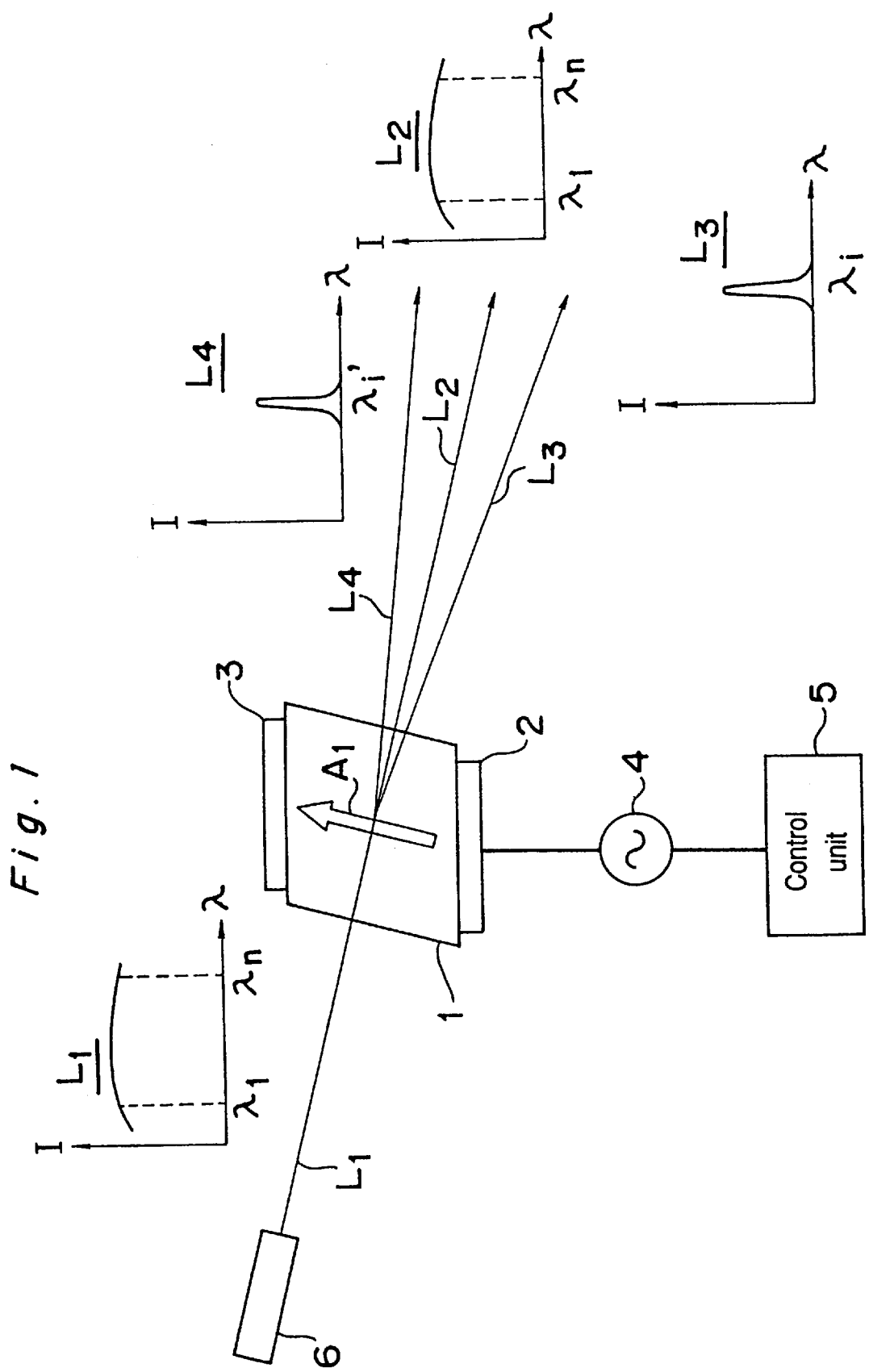
FIG. 1 is a schematic illustration that shows the system configuration of an AOTF in accordance with the present invention.

As shown in FIG. 1, in an acousto-optic tunable filter (AOTF) in accordance with the present invention, a transducer 2 that applies (radiates) an acoustic wave into a crystal body 1 (AOTF cell) formed of a $TeO_2$ crystal is attached (bonded) to one end (bottom end) of crystal body 1, and an absorber 3 that absorbs the acoustic wave propagating through crystal body 1 as shown by the arrow $A_1$ is attached (bonded) to the other end (top end) of crystal body 1. Transducer 2 is driven by a tunable acoustic wave driver 4 that is controlled by a control unit 5. Transducer 2 can generate an acoustic wave of an arbitrary frequency.

A source light beam (incident light beam) $L_1$ that is formed of white light of a broad bandwidth is radiated from a light source 6 onto one side (left side) of crystal body 1. The source light beam $L_1$ is separated into a 0-order ray $L_2$, a diffracted ordinary ray $L_3$ (+1 order), and a diffracted extraordinary ray $L_4$ (−1 order) during the time when it passes through crystal body 1. Here the 0-order ray $L_2$ is formed of monochromatic light of a broad bandwidth having a similar spectrum as the source light beam $L_1$, that is, the one obtained by deleting the diffracted ordinary ray $L_3$ and the diffracted extraordinary ray $L_4$ from the source light beam $L_1$. The diffracted ordinary ray $L_3$ and the diffracted extraordinary ray $L_4$ are respectively formed of monochromatic light of wavelengths $\lambda_i$ and $\lambda_r$, and have been separated from the source light beam $L_1$ by the primary diffraction.

The reason why the two diffracted rays $L_3$ and $L_4$ are induced by diffraction in crystal body 1 from the source light beam $L_1$ is well known, so that its detailed description is omitted from here. When the acoustic wave propagates within crystal body 1 as shown by the arrow $A_1$, the crystal lattice of $TeO_2$ is distorted owing to the acoustic wave, so that the distorted lattice functions as a grating. As a result, wavelength components corresponding to the acoustic frequency of the source light beam $L_1$ are diffracted, so that the monochromatic diffracted rays $L_3$ and $L_4$ occur and travel in directions different from the path of the 0-order ray $L_2$. In this case, the diffracted ordinary ray $L_3$ is obtained from the incident extraordinary ray of the source light beam $L_1$, and the diffracted extraordinary ray $L_4$ is obtained from the incident ordinary ray of the source light beam $L_1$.

This diffraction phenomenon is also explained in terms of the quantum theory. According to the quantum theory, an acoustic wave is considered as particles called phonons that have momentum or energy corresponding to its frequency. The incident extraordinary ray and the incident ordinary ray are considered as photons that have momentum or energy corresponding to their frequencies (or wavelengths). Photons can form new photons by uniting with phonons or discharging phonons with in a range of the conservation of energy or the conservation of momentum. Therefore, the photons in the incident ordinary ray collide and unite with phonons in crystal body 1 to become new photons with a new direction, forming the diffracted extraordinary ray. On the other hand, the photons in the incident extraordinary ray discharge phonons to become new photons with a new direction, forming the diffracted ordinary ray.

As described above, in a prior AOTF, the intensity of the diffracted ordinary ray is measured to perform the spectrometry of the source light beam, that is, to obtain the spectrum of the source light beam, while the acoustic frequency is varied. However, there has been a problem that accurate spectrometry cannot be performed, if the intensity of the source light beam is low, or if the intensity of the components of the source light beam in a wavelength region is low. Further, there has been a problem that the diffraction length of the acoustic and optic waves cannot be obtained unless the volume of the used uniaxial crystal material is unreasonably increased.

In contrast, in the AOTF of the present invention, spectrometry is performed in the following method, so that spectrometry can be performed with high accuracy, even if the intensity of the source light beam is low, or even if the intensity of the components of the source light beam in a wavelength region is low. Also, the diffraction length of the acoustic and optic waves can be obtained without an unreasonable increase in the used uniaxial crystal material. In the following is described a basic structure of the present AOTF.

In the AOTF of the present invention, the source light beam $L_1$ having a predetermined receiving angular aperture is made off-perpendicularly incident on the surface of crystal body 1 at a predetermined source light incident angle between 0° and 90°. Here the optic axis of the source light beam lies on the plane determined by the optic axis of the crystal body and the normal to the crystal body surface, and the source light incident angle is defined as the angle between the crystal surface normal and the optic axis of the source light beam $L_1$. In this case, the source light beam $L_1$ of a cone shape having a circular cross section is made off-perpendicularly incident on the surface of the crystal body. Then the beam narrowing phenomenon occurs, so that the cross section is reduced in a predetermined direction within crystal body 1 to become elliptic.

Figure 2:
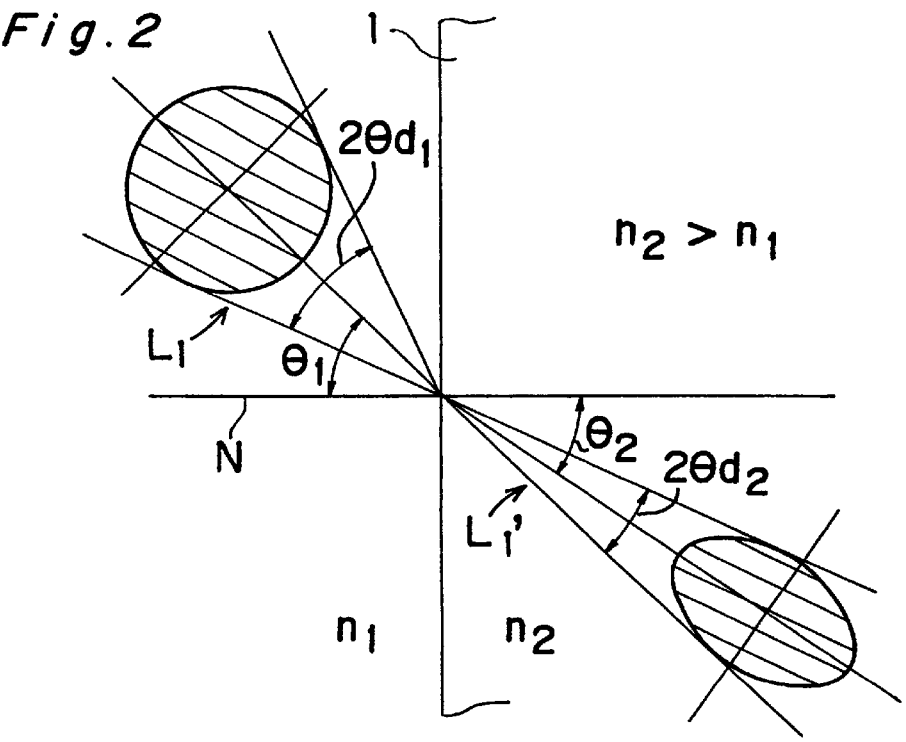
FIG. 2 illustrates the beam narrowing phenomenon that when the source light beam $L_1$ of a cone shape with a circular cross section is made off-perpendicularly incident on the surface of crystal body 1, the cross section of the source light beam $L_1'$ within the crystal body becomes elliptic.

FIG. 2 schematically illustrates the beam narrowing phenomenon that when the source light beam $L_1$ of a cone shape with a circular cross section is made off-perpendicularly incident on the surface of crystal body 1, the cross section of the source light beam $L_1'$ within the crystal body becomes elliptic. The beam narrowing phenomenon occurs, because the refractive index in the direction parallel to the paper and the refractive index in the direction normal to the paper are different, so that the diameter of the cross section on the page (the plane determined by the optic axis of the crystal body and the normal to the crystal body surface) and the diameter of the cross section perpendicular to the page change at different ratios. In FIG. 2, $\theta_1$ denotes the source light incident angle, that is, the angle between the optic axis of the source light beam $L_1$ and the crystal body surface normal N; $\theta_2$ denotes the angle between the optic axis of the source light beam $L_1'$ within the crystal body and the crystal body surface normal N. The angle $\theta_2$ is called source light refraction angle hereafter. Further, the angles $2\theta d_1$ and $2\theta d_2$ respectively denote the convergence angle of the source light beam $L_1$ and divergence angle of the source light beam $L_1'$ within the crystal body. Also, $n_1$ and $n_2$ are respectively the refractive indices of the air and crystal body 1.

As shown in FIG. 2, when the source light beam $L_1$ is made incident onto crystal body 1 from the air, the divergence angle of the source light beam $L_1'$ within the crystal body becomes narrower than the convergence angle of the source light beam $L_1$ outside crystal body 1. The angular aperture of the cross section of the source light beam $L_1'$ within the crystal body depends on the source light incident angle $\theta_1$, the polarization state of the beam (the ordinary ray or the extraordinary ray), and the wavelength of the light, that is, the angular aperture is a function of these parameters.

Figure 9:
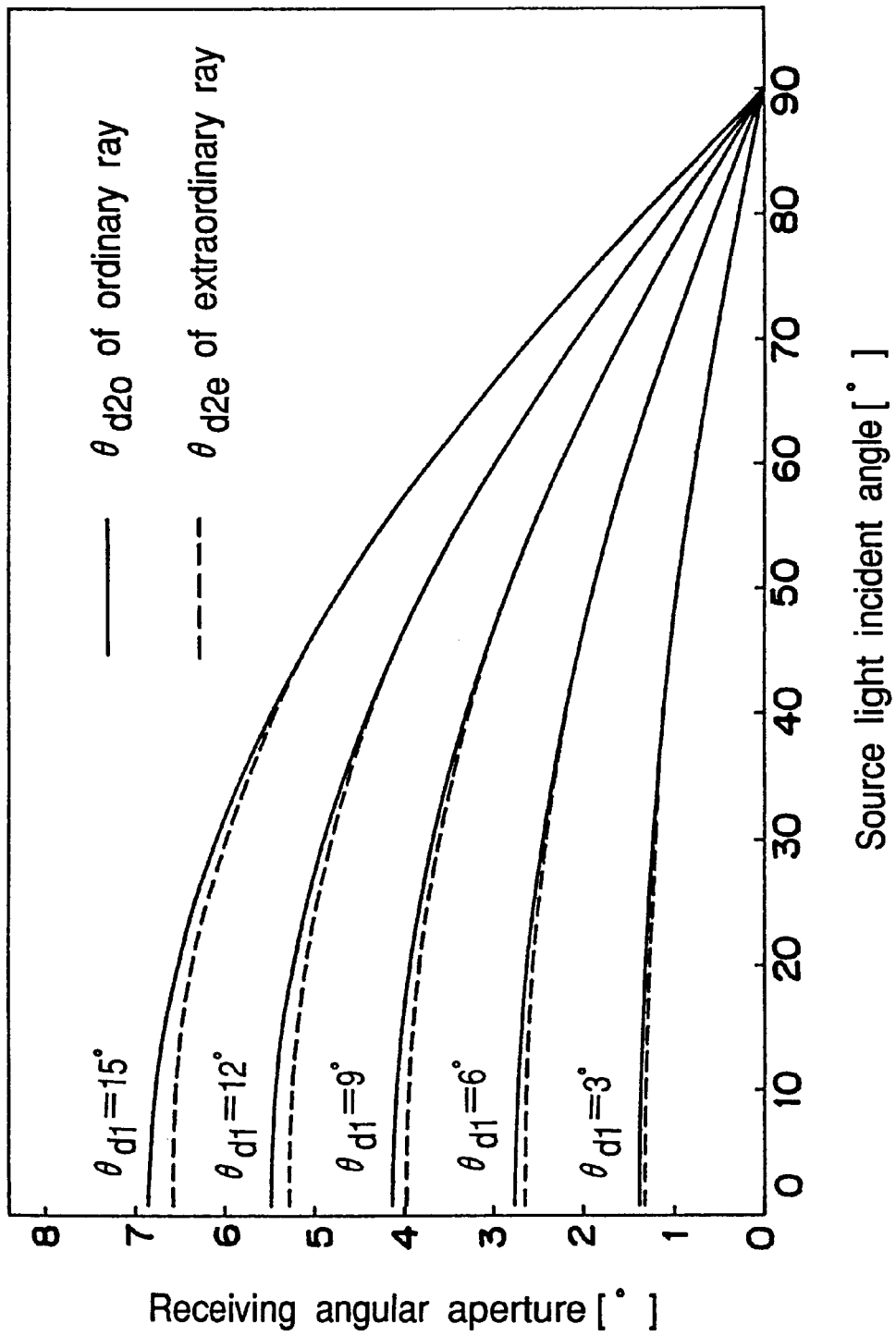
FIG. 9 is a graph illustrating the narrowed angular aperture of the source light beam within the crystal body depending on the source light incident angle with the angular aperture of the source light beam as a parameter.

The angular aperture of the source light beam within the crystal body becomes smaller, as the source light incident angle $\theta_1$ becomes larger (See FIG. 9). Further, the angular aperture becomes gradually smaller, as the surface angle of the crystal body $\theta_s$ becomes greater (See FIG. 10). Here the surface angle of the crystal body is defined as the angle between the crystal surface normal and the optic axis of the crystal body. The virtual angular aperture of the source light beam $L_1$ becomes greater, as the degree of the narrowing of the source light beam within the crystal body becomes greater. By using the beam narrowing phenomenon, the receiving angular aperture of the crystal body in the AOTF can be enlarged, and hence the amount of collected light can be increased. Therefore, spectrometry can be performed with high accuracy, even if the intensity of the source light beam is low, or even if the intensity of the components of the source light beam in a wavelength region is low.

Figure 3:
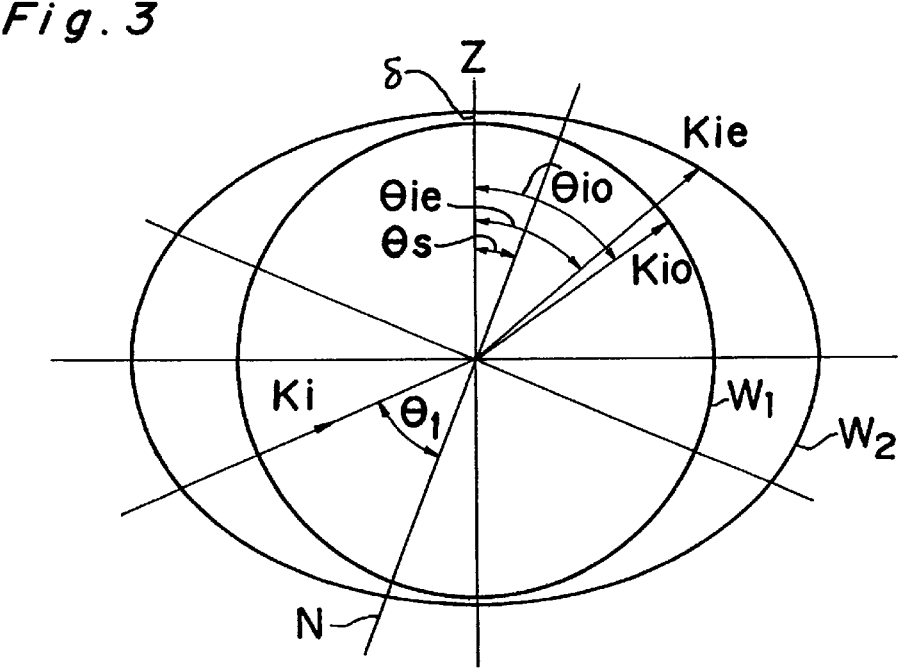
FIG. 3 is an illustration that shows the relationship between the optic incident wavevectors, optic diffracted wavevectors, and acoustic wavevector within the crystal body in a polar coordinate system.

FIG. 3 illustrates the positional relationship about the light beams and acoustic waves in terms of the magnitudes and angles of wavevectors. Referring to FIG. 3, the vector $K_i$ is the optic wavevector of the source light beam $L_1$. The vector $K_{io}$ is the optic wavevector of the ordinary ray in the source light beam $L_1'$ within the crystal body. The vector $K_{ie}$ is the optic wavevector of the extraordinary ray in the source light beam $L_1'$ within the crystal body. The angle $\theta_{io}$ and $\theta_{ie}$ are respectively the angles of the optic wavevectors $K_{io}$ and $K_{ie}$. The angle $\theta_1$ is the source light incident angle, and the angle $\theta_s$ is the surface angle of the crystal body.

Further, in the present AOTF, the source light beam $L_1$ is made off-perpendicularly incident on the surface of crystal body 1. Therefore, if the source light incident angle $\theta_1$ is adequately set, then there is no need to have a non-diffraction part for making the source light beam $L_1$ perpendicularly incident as in a prior AOTF. That is, it is only necessary that the shape of crystal body 1 be made slightly larger than the part in which the acoustic wave propagates. Therefore, the non-diffraction part, that is, the idle part irrelevant of the propagation of the acoustic wave is almost non-existent. Therefore, the diffraction length of the acoustic and optic waves can be obtained without a substantial increase in the volume of the used crystal material. Therefore, the degree of effective use of the crystal material is increased, so that an AOTF of high spectral resolution and low cost can be obtained.

Figure 4:
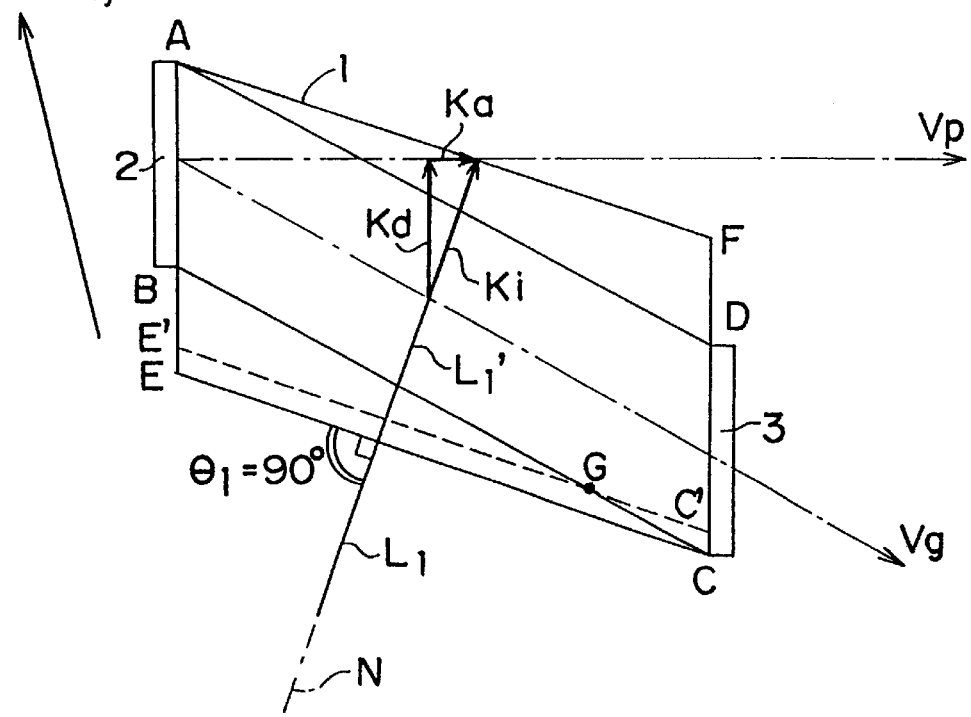
FIG. 4 is a schematic drawing of a prior AOTF in which the source light beam is made perpendicularly incident on the surface of the crystal body.
Figure 5:
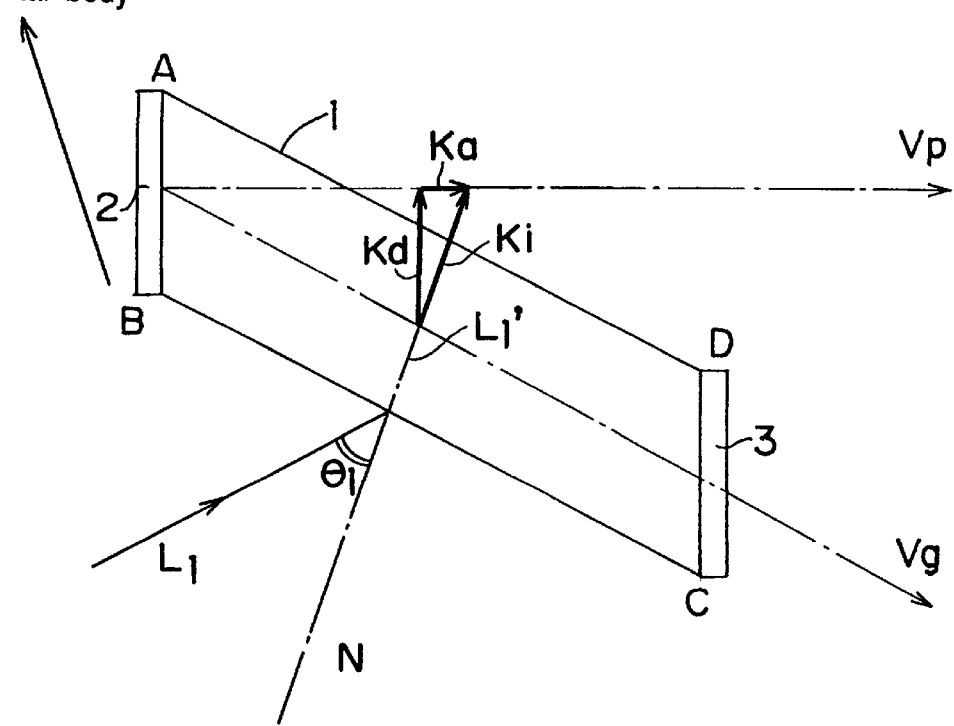
FIG. 5 is a schematic drawing of an AOTF in accordance with the present invention in which the source light beam is made off-perpendicularly incident on the surface of the crystal body.

The reason for the degree of effective use of the crystal body being increased is described in the following. FIG. 4 is a schematic drawing of a prior AOTF in which the source light beam $L_1$ is made perpendicularly incident on the surface of crystal body 1. FIG. 5 is a schematic drawing of an AOTF in accordance with the present invention in which the source light beam $L_1$ is made off-perpendicularly incident on the surface of crystal body 1.

Referring to FIG. 4, when an acoustic wave is made incident on the acoustic surface of crystal body 1, there occurs the direction in which the phase of the acoustic wave changes (direction $V_p$ of phase velocity), and the direction in which the energy of the acoustic wave flows (direction $V_g$ of group velocity). These two directions are different. Here the acoustic incident surface of crystal body 1 must be perpendicular to the direction of phase velocity. Therefore, in the AOTF, when the direction $V_p$ of phase velocity is set, the angle of the acoustic incident surface of crystal body 1 is determined, and hence the direction $V_g$ of group velocity is also determined.

In FIG. 4, the quadrilateral AECF represents the shape of crystal body 1. The quadrilateral ABCD represents the diffraction part in which the acoustic wave propagates. The triangle BEC represents a first non-diffraction part for making the source light beam $L_1$ perpendicularly incident on the surface of crystal body 1. The triangle ADF represents a second non-diffraction part for making the surface opposite to the optic incident surface parallel to that surface. Further, the vectors $K_i$, $K_d$, $K_a$ respectively represent the incident light wavevector, the diffracted light wavevector, and the acoustic wavevector.

In this crystal body 1, when the energy flow of the acoustic wave collides with an end of the crystal body, that is, if the edge EC or AF of the quadrilateral AECF intersects with the quadrilateral ABCD, then a reflected wave of the acoustic wave occurs, so that the spectral performance of the AOTF declines by the reflected acoustic wave. Therefore, it is required that the quadrilateral ABCD lie within the quadrilateral AECF. For example, if the edge EC is located in the position indicated by the dotted line E'C', then the acoustic wave is reflected at the end of crystal body 1 represented by the edge GC', so that the spectral performance declines.

Consequently, in a prior AOTF in which the source light beam $L_1$ is made perpendicularly incident on the surface of the acoustic body, the shape of crystal body 1 is determined as follows:

(1) The angle $\theta_i$ of the optic incident wavevector (angle between the optic axis of the crystal body and the optic axis of the source light beam) to satisfy predetermined diffraction conditions is calculated. Then the angle $\theta_a$ of the acoustic wavevector (angle between the optic axis of the crystal body and the acoustic wave) is calculated.

(2) The direction of the edge AE on the acoustic incident surface is obtained based on $\theta_a$, and the direction of the edge EC on the surface of the crystal body is obtained based on $\theta_i$.

(3) The angle between the direction $V_p$ of phase velocity and the direction $V_g$ of group velocity is obtained.

(4) The width of the acoustic wave (length of the edge AB) and the length of the crystal body surface (length of the edge EC) are calculated so that the diffraction length of the acoustic and optic waves should become a desired value. Then the length of the edge BE in the first non-diffraction part is obtained. The edge AF in the second non-diffraction part is made parallel to the edge EC. In this way, the quadrilateral AECF representing the shape of crystal body 1 is determined.

In the prior AOTF illustrated in FIG. 4, the acoustic wave propagates in the direction $V_g$ of group velocity in a width of the length of edge AB. Therefore, the acoustic wave propagates in the part represented by the quadrilateral ABCD. Therefore, the quadrilateral ABCD represents the diffraction part. However, the first and second non-diffraction parts represented by triangles BEC and ADF are idle parts that are irrelevant of the propagation of the acoustic wave. Therefore, in the crystal body 1 of the prior AOTF, the idle parts occupy a considerable part of the crystal body.

On the other hand, in the AOTF of the present invention, the source light beam $L_1$ is made off-perpendicularly incident on the surface of crystal body 1, as shown in FIG. 5. Therefore, the non-diffraction part is not necessary. In this case, the optic incident angle $\theta_1$ can be arbitrarily set. Therefore, the source light incident angle $\theta_1$ is adjusted so that a desired angle of the optic incident wavevector should be obtained. More specifically, the shape of crystal body 1 and the source light incident angle $\theta_1$ are determined as follows:

(1) The relation between the surface angle $\theta_s$ of the crystal body and the source light incident angle $\theta_1$ is calculated to satisfy predetermined diffraction conditions. Then the angle $\theta_a$ of the acoustic wavevector is calculated.

(2) The direction of the edge AB on the acoustic incident surface is obtained based on $\theta_a$.

(3) The angle between the direction $V_p$ of phase velocity and the direction $V_g$ of group velocity is obtained.

(4) The direction of the edge BC on the crystal body is obtained based on $V_g$.

(5) The width of the acoustic wave (length of the edge AB) and the length of the crystal body surface (length of the edge BC) are calculated so that the diffraction length of the acoustic and optic waves should become a desired value. The edge AD on the surface opposite to the optic incident surface is made parallel to the edge BC. In this way, the quadrilateral AECF representing the shape of crystal body 1 is determined.

(6) The source light incident angle $\theta_1$ is obtained by determining the value of the surface angle $\theta_s$ considering the dependency on the wavelength, the Brewster angle, and effects of the beam narrowing phenomenon.

In the AOTF of the present invention illustrated in FIG. 5, the acoustic wave propagates in almost the entire part (represented by the quadrilateral ABCD) of crystal body 1, and non-diffraction part, that is, the idle part is substantially non-existent. Therefore, the diffraction length of the acoustic and optic waves can be sufficiently obtained without unreasonably increasing the used volume of the uniaxial crystal material. Therefore, the degree of efficient use of crystal body 1 is increased, and an AOTF of low cost and high resolution can be obtained.

In the AOTF of the present invention, the source light incident angle $\theta_1$ is preferably set at an equivalence value for which the wavelength of the diffracted ordinary ray and the wavelength of the diffracted extraordinary ray become approximately identical. If the source light incident angle $\theta_1$ is set at the equivalence value, then the receiving angular aperture can be further increased, so that the amount of collected light within crystal body 1 is further increased, and the accuracy of spectrometry is further enhanced.

In this case, the angle $\theta_s$ of the crystal body surface is preferably set at a range, for example around 40°, for which the equivalence value is large, and its dependency on the wavelength of the diffracted rays is small. If the angle $\theta_s$ of the crystal body surface is small, then the dependency of the equivalence value on the wavelength of the diffracted rays becomes large, while the equivalence value of the source light incident angle $\theta_1$ becomes large. Therefore, in this case, the wavelength of the diffracted ordinary ray and the wavelength of the diffracted extraordinary ray cannot be made identical at a wide range, while the beam narrowing phenomenon and the degree of effective use of the crystal body are enhanced. On the other hand, if the angle $\theta_s$ of the crystal body surface is large, then the source light incident angle $\theta_1$ becomes small, while the dependency of the equivalence value on the wavelength of the diffracted rays becomes small. Therefore, in this case, the beam narrowing phenomenon and the degree of effective use of the crystal body become small, while the wavelength of the diffracted ordinary ray and the wavelength of the diffracted extraordinary ray can be made identical at a wide range. Therefore, the angle $\theta_s$ of the crystal body surface is preferably set at a range, for example around 40°, for which the equivalence value of the source light incident angle is comparatively large, and its dependency on the wavelength of the diffracted rays is comparatively small.

In the present AOTF, the dependency of the equivalence value on the wavelength of the diffracted rays becomes smaller, as the wavelength of the diffracted rays becomes longer. Therefore, the source light is preferably light of long wavelength, for example near infrared rays.

When the source light incident angle $\theta_1$ is set at the equivalence value, the wavelength $\lambda_j$ of the diffracted ordinary ray $L_3$ and the wavelength $\lambda_j'$ of the diffracted ordinary ray $L_4$, which are separated from the source light beam $L_1$ radiated onto crystal body by light source 6, become substantially identical. Therefore, if the diffracted ordinary ray $L_3$ and the diffracted extraordinary ray $L_4$ are superposed to form a superposed diffracted ray, and if the intensity of the superposed diffracted ray is detected, then spectrometry can be performed with high accuracy, even if the intensity of the source light beam is low, or even if the intensity of the components of the source light beam in a wavelength region is low. Here the intensity of the superimposed diffracted ray is measured continuously or discretely, while the frequency of the acoustic wave applied to acoustic body 1 is varied by transducer 2.

Mathematical procedures or analytical techniques used in designing the AOTF of the present invention are detailed in the following with actual processing and results. In an AOTF in which the source light incident angle $\theta_1$ is determined by the procedures, it is believed that the receiving angular aperture is greater than the optical value of a prior AOTF by tens of percent by the beam narrowing phenomenon of the source light beam $L_1'$ within the crystal body.

Mathematical Formulation of the State or Behavior of the AOTF

Figure 6:
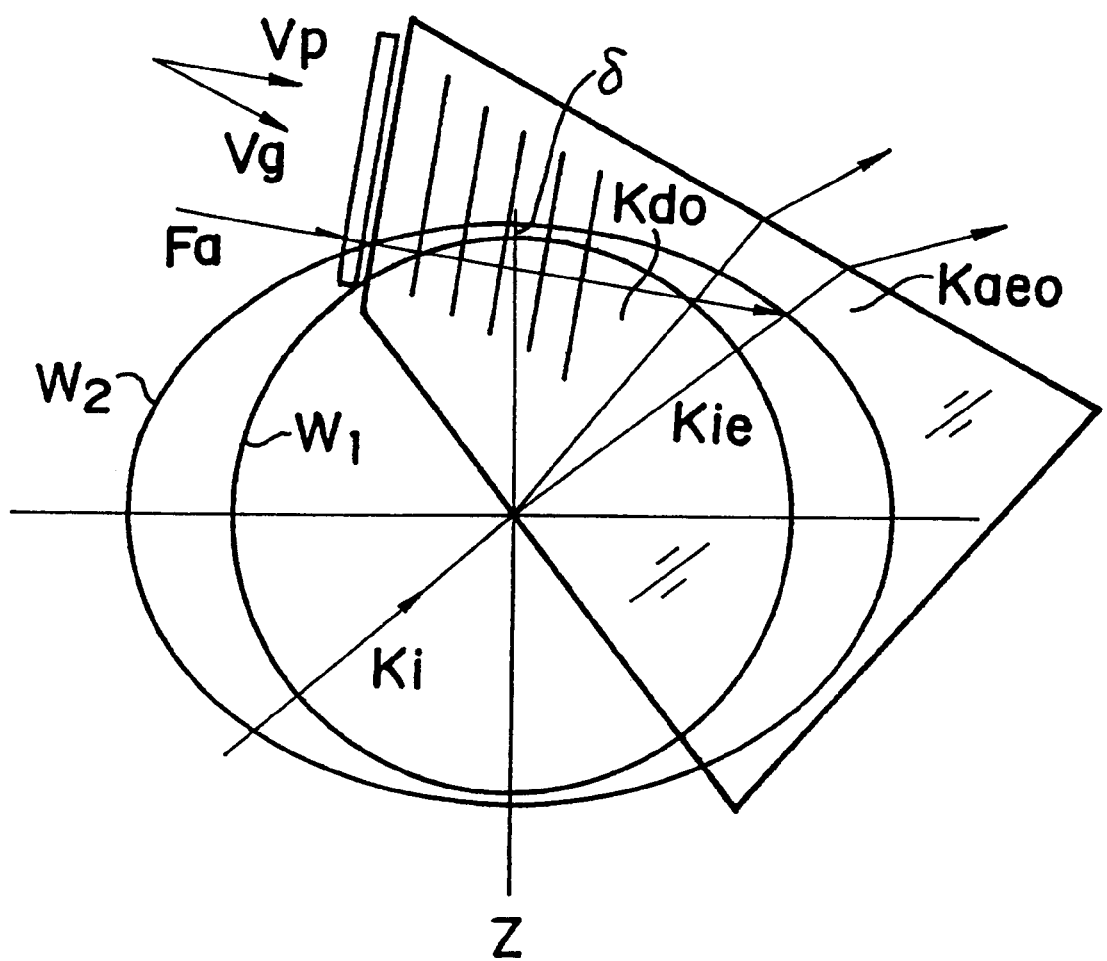
FIG. 6 illustrates the diffraction state in a prior AOTF, in which the source light beam is perpendicularly incident on the surface of the crystal body.
Figure 7:
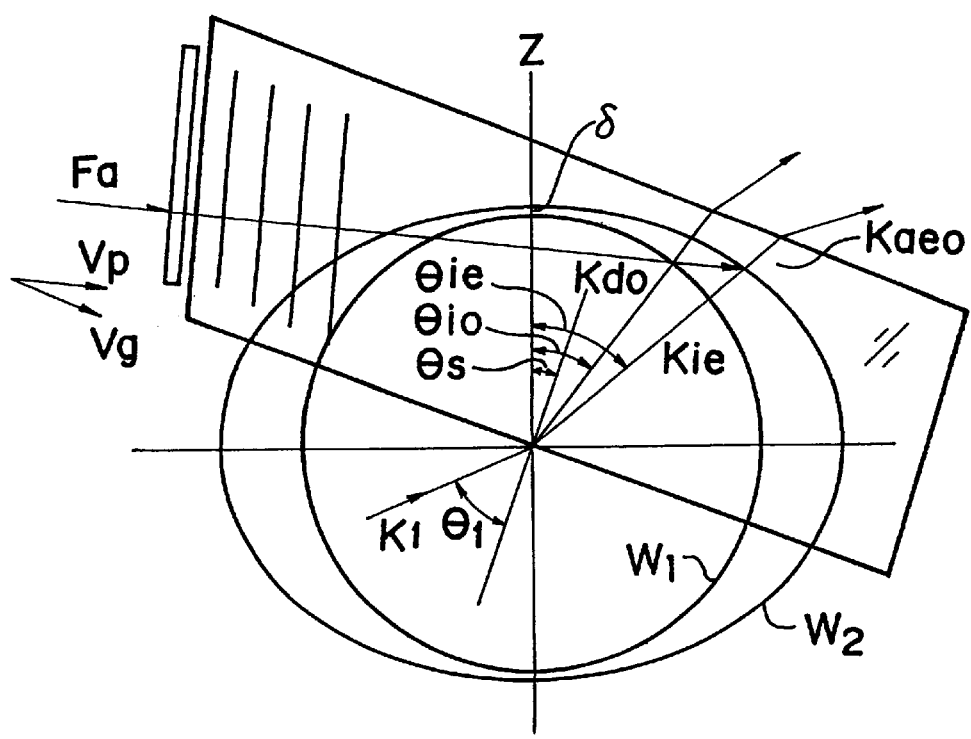
FIG. 7 illustrates the diffraction state in the present AOTF in which the source light beam is off-perpendicularly incident on the surface of the crystal body.
Figure 8:
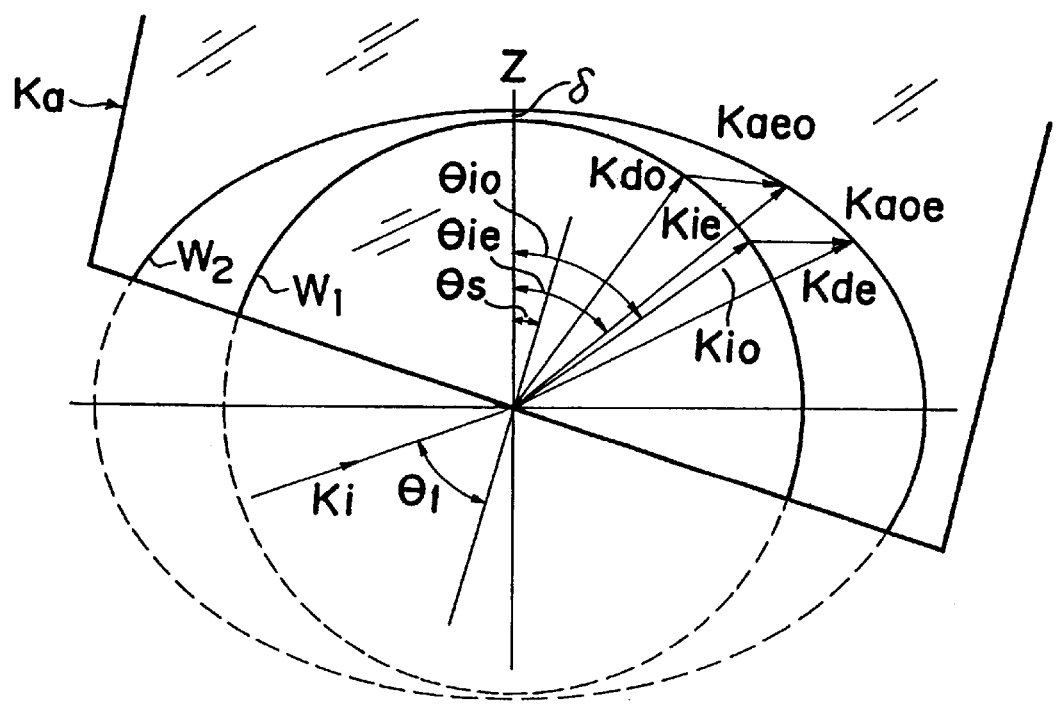
FIG. 8 illustrates the diffraction state in the present AOTF in which the source light beam is off-perpendicularly incident on the surface of the crystal body, and the source light incident angle is an equivalence value.

First, the state or behavior of the present AOTF is represented by a plurality of modeling equations, referring to FIGS. 3, 6, 7, 8. FIG. 6 illustrates the diffraction state in a prior AOTF, in which the source light beam is perpendicularly incident on the surface of the crystal body. FIGS. 7, 8 illustrate the diffraction state in the present AOTF in which the source light beam is off-perpendicularly incident on the surface of the crystal body. In these figures, the cross-sections $W_1$, $W_2$ of the wavevector surfaces are respectively described as a circle and an ellipse. The Z-axis, which is also the polar axis of a polar coordinate system, represents the [001] optic axis of the uniaxial crystal. There exists a gap $\delta$ between the wavevector surfaces.

In these figures, the vector $K_i$ is the wavevector of the source light beam having the source light incident angle $\theta_1$. The vector $K_{ie}$ is the wavevector of the incident extraordinary ray having the angle $\theta_{ie}$ with the optic axis of the crystal body; $K_{io}$ is the wavevector of the incident ordinary ray having the angle $\theta_{io}$ with the optic axis of the crystal body. The vector $K_{de}$ is the wavevector of the diffracted extraordinary ray having the angle $\theta_{de}$ with the optic axis of the crystal body; $K_{do}$ is the wavevector of the diffracted ordinary ray having the angle $\theta_{do}$ with the optic axis of the crystal body. The vectors $K_{aeo}$ and $K_{aoe}$ are the acoustic wavevectors respectively having the angles $\theta_{aeo}$ and $\theta_{aoe}$ with the optic axis of the crystal body.

Here the diffracted ordinary ray represented by $K_{do}$ is generated from interaction of the acoustic wave represented by $K_{aeo}$ and the incident extraordinary ray represented by $K_{ie}$. Similarly, the diffracted extraordinary ray represented by $K_{de}$ is generated from interaction of the acoustic wave represented by $K_{aoe}$ and the incident ordinary ray represented by $K_{io}$.

Refractive Index Surfaces of the Crystal Body

Let the wavelength of the monochromatic incident extraordinary ray and the incident ordinary ray be $\lambda$. The refractive index surface for the extraordinary ray is represented by the ellipse $$1/n_{ie}^2 = \cos^2\theta_{ie}/[(1+\delta)^2 n_o^2(\lambda)] + \sin^2\theta_{ie}/n_e^2(\lambda).$$

Further, the refractive index surface for the ordinary ray is represented by the ellipse $$1/n_{io}^2 = \cos^2\theta_{io}/[(1-\delta)^2 n_o^2(\lambda)] + \sin^2\theta_{io}/n_o^2(\lambda).$$

Therefore, $$n_{ie} = n_{ie}(\theta_{ie}, \lambda) \quad (1)$$
$$= \{\cos^2\theta_{ie}/[(1+\delta)n_o^2(\lambda)] + \sin^2\theta_{ie}/n_e^2(\lambda)\}^{-1/2}.$$

$$n_{io} = n_{io}(\theta_{io}, \lambda) \quad (2)$$
$$= \{\cos^2\theta_{io}/[(1-\delta)^2 n_o^2(\lambda)] + \sin^2\theta_{io}/n_o^2(\lambda)\}^{-1/2}.$$

In the equations (1) and (2), the suffix ie indicates the incident extraordinary ray and the suffix io indicates the incident ordinary ray. As illustrated in FIG. 3, $\theta_{ie}$ and $\theta_{io}$ are respectively the angles between the optic axis of the crystal body and the extraordinary wavevector and the ordinary wavevector. The refractive indices $n_e(\lambda)$ and $n_o(\lambda)$ are determined by the following equations (3) and (4), which are the dispersion equations for $TeO_2$.

$$n_e^2(\lambda) = 1 + 2.8525\lambda^2/(\lambda^2 - 0.1342^2) + 1.5141\lambda^2/(\lambda^2 - 0.2631^2), \quad (3)$$

$$n_o^2(\lambda) = 1 + 2.5844\lambda^2/(\lambda^2 - 0.1342^2) + 1.1557\lambda^2/(\lambda^2 - 0.2638^2). \quad (4)$$

Further, the gap $\delta$ is expressed by the following equation (5), which is due to Warner et al.

$$\delta(\lambda) = [n_{ie}(0,\lambda) - n_{io}(0,\lambda)]/2n_o(\lambda) \approx 4.55 \times 10^{-4}. \quad (5)$$

The Beam Narrowing Phenomenon Within the Crystal Body

The present inventors studied the beam narrowing phenomenon within the crystal body in the case where the surface of crystal body 1 is not perpendicular to the source light beam $L_1$. FIG. 2 illustrates the beam narrowing phenomenon that when the source light beam $L_1$ of a cone shape with a circular cross section is made off-perpendicularly incident on the surface of crystal body 1, the cross section of the source light beam $L_1$ within the crystal body becomes elliptic. This beam narrowing phenomenon occurs, because the refractive index in the direction parallel to the paper and the refractive index in the direction normal to the paper are different, so that the diameter of the cross section on the page and the diameter of the cross section perpendicular to the paper change at different ratios.

Using the various angles illustrated in FIG. 3, the beam narrowing phenomenon can be described by the relationships about the angles for monochromatic light. The relationships about the angles on the page are expressed by the following equations (6) and (7). The relationships about the angle on the plane determined by the optic axis of the source light beam $L_1$ and the normal to the page are expressed by the following equations (8) and (9).

$$\frac{\sin(\theta_{io} - \theta_s)}{\sqrt{\frac{\cos^2\theta_{io}}{(1-\delta)^2 n_o^2(\lambda)} + \frac{\sin^2\theta_{io}}{n_o^2(\lambda)}}} - \sin\theta_1 = 0 \quad (6)$$

-continued $$\frac{\sin(\theta_{ie} - \theta_s)}{\sqrt{\frac{\cos^2\theta_{ie}}{(1+\delta)^2 n_o^2(\lambda)} + \frac{\sin^2\theta_{ie}}{n_e^2(\lambda)}}} - \sin\theta_1 = 0 \quad (7)$$

$$\frac{\sin(\theta_{p2o})}{\sqrt{\frac{\cos^2\theta_{p2o}}{n_{io}^2(\theta_{io},\lambda)} + \frac{\sin^2\theta_{p2o}}{n_o^2(\lambda)}}} - \sin\theta_{pI} = 0 \quad (8)$$

$$\frac{\sin(\theta_{p2e})}{\sqrt{\frac{\cos^2\theta_{p2e}}{n_{ie}^2(\theta_{ie},\lambda)} + \frac{\sin^2\theta_{p2e}}{n_e^2(\lambda)}}} - \sin\theta_{pI} = 0 \quad (9)$$

Figure 10:
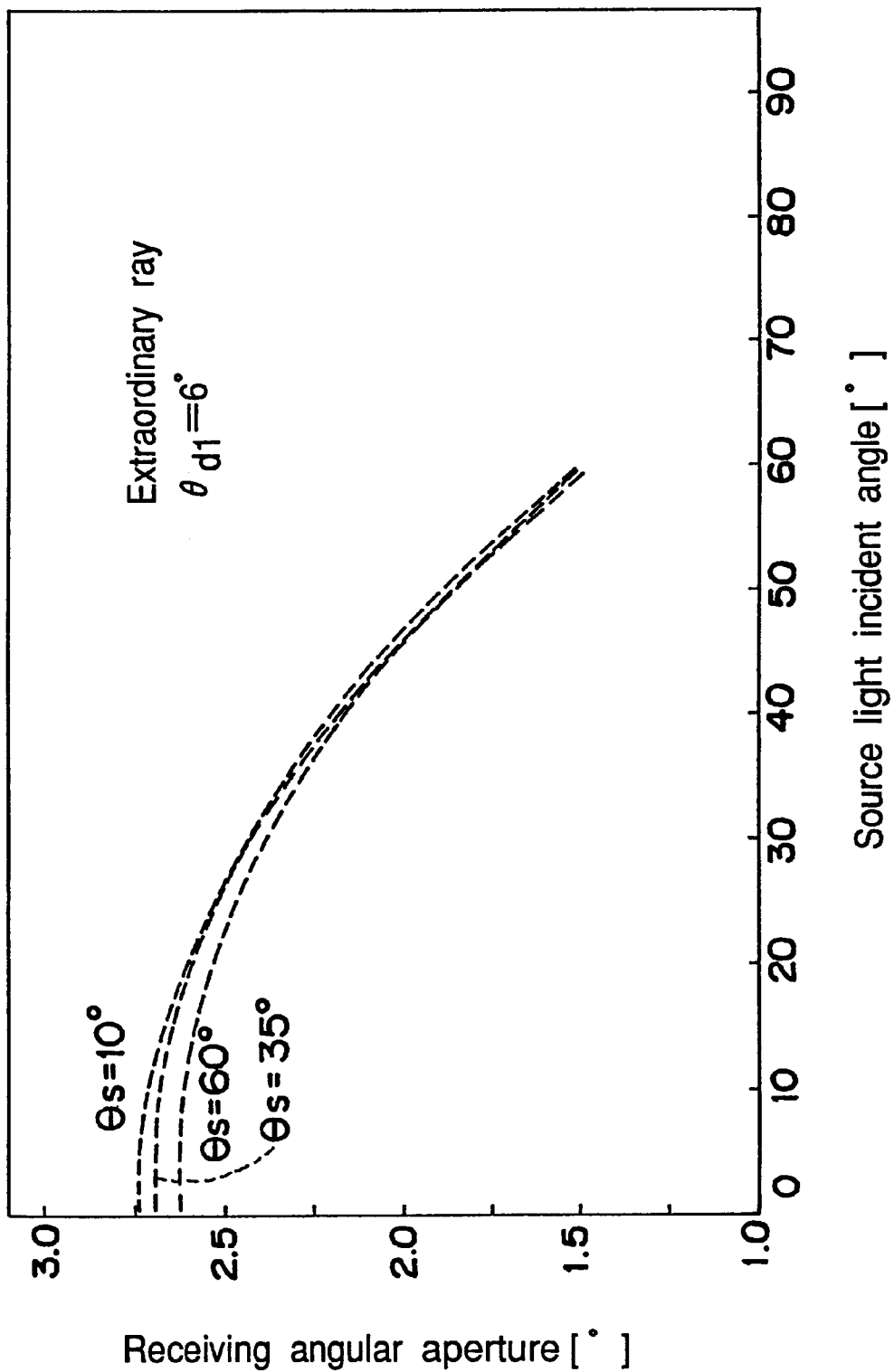
FIG. 10 is a graph illustrating the narrowed angular aperture of the source light beam within the crystal body depending on the source light incident angle with the surface angle of the crystal body as a parameter.
Figure 11:
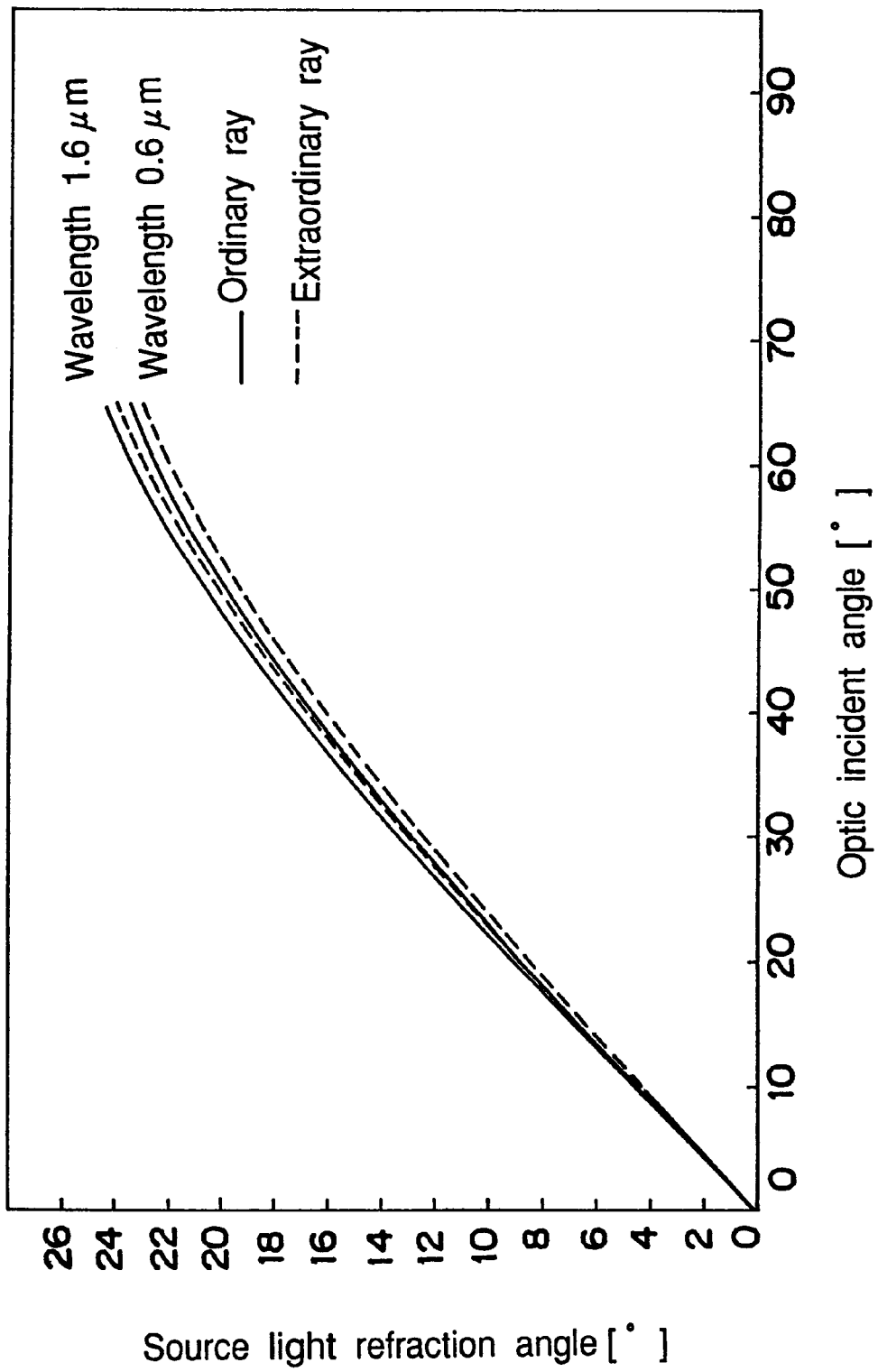
FIG. 11 is a graph illustrating the source light refraction angles of the ordinary ray and the extra ordinary ray within the crystal body depending on the source light incident angle with the optic wavelength and the polarization state as parameters.

Here, $\theta_1$ is the incident angle of a ray, of the source light beam $L_1$, on the page. The angle $\theta_{p1}$ is the incident angle of a ray, of the source light beam $L_1$, on the plane determined by the optic axis of the beam $L_1$ and the normal to the page; $\theta_{p2o}$ and $\theta_{p2e}$ are respectively the source light refraction angles of the ordinary ray and the extraordinary ray on that plane within the crystal body. The angles $\theta_{io}$ and $\theta_{ie}$ are respectively the angles between the optic axis of the crystal body and the ordinary ray and the extraordinary ray separated by refraction from the corresponding ray of the source light beam $L_1$ within the crystal body. $n_{ie}(\theta_{ie},\lambda)$ and $n_{io}(\theta_{io},\lambda)$ are obtained by the equations (1) and (2). $\theta_s$ is the surface angle of crystal body 1. Note that in (6) and (7), $\theta_{io}$–$\theta_s$ and $\theta_{ie}$–$\theta_s$ are source light refraction angles for the rays on the page. The behavior of the rays on the plane perpendicular to the page does not have much effects on the performance of the AOTF, so that it is not described in the following. No analytic solutions exist for the equations (6), (7), (8), (9). FIGS. 9 to 11 illustrate results of the numerical solutions of (6) and (7).

Computation Results

As illustrated in FIGS. 9 and 10, the angular aperture of a cone-shaped beam within the crystal body becomes smaller as the source light incident angle increases. In these figures, $\theta_{d1}$ is the half of the convergence angle of the source light beam $L_1$ in the air. The angles $\theta_{d2o}$ and $\theta_{d2e}$ are respectively the halves of divergence angles of the ordinary ray and the extraordinary ray within the crystal body. As shown in FIG. 10, if the source light incident angle is very large, then the surface angle of the crystal body does not have much effects on the beam narrowing phenomenon. As clear from FIG. 11, if the source light beam $L_1$ is not perpendicularly incident on the surface of crystal body 1, then the ordinary ray and the extraordinary ray are separated from each other.

(a) The reflectance of the polarization component of the source light beam $L_1$ on the page becomes 0 at the Brewster angle, so that it all enters the crystal body as a refracted ray, and the reflectance increases at a larger angle. On the other hand, the reflectance of the polarization component of the source light beam $L_1$ normal to the page has no problem with the Brewster angle. However, if the incident angle is too large, then the reflectance becomes great, so that a loss due to reflectance becomes large even if the surface of the crystal body is coated. Since the Brewster angle for a $TeO_2$ crystal is about 66°, it is preferable that the source light incident angle is set at an angle less than 60° to balance the reflectance loss with the degree of beam narrowing phenomenon. Therefore, if the source light incident angle $\theta_1$ is set at a comparatively large angle, for example 45°, then the beam can be narrowed into 75% of the perpendicularly incident beam.

(b) Consider the case where the surface of crystal body 1 is perpendicular to the source light beam $L_1$ as in the AOTF illustrated in FIG. 6. If the angle $\theta_i$ of the optic incident wavevector is calculated from the conservation-of-momentum condition and the parallel-tangent condition, then the angle $\theta_a$ of the acoustic wavevector is uniquely obtained from the angle $\theta_i$ of the optic incident wavevector. For example, if $\theta_i$ is set at 20°, then $\theta_a$ is about 100°. Similarly, if $\theta_i$ is set at 35°, then $\theta_a$ is about 105°. Further, if $\theta_i$ is set at the equivalence incident angle for which the wavelengths of the two diffracted rays become identical, that is, if $\theta_i$ is 56°, then $\theta_a$ is about 108°.

In perpendicular incidence, according to computations, the angle between the surface of the crystal body and the acoustic incident surface (the surface on which transducer 2 is attached) becomes respectively 100°, 110°, and 128° in the above three examples. If the angle between the two surfaces is greater than 90° as in these cases, then either the diffraction length of the acoustic and optic waves becomes too short, or a crystal body of a large size becomes necessary for obtaining a required diffraction length, because a larger diffraction length is required for higher spectral resolution.

In contrast, if the source light beam $L_1$ is off-perpendicularly incident on the surface of crystal body 1 in an AOTF, then the receiving angular aperture can be enlarged, and the above problem can be also solved. FIG. 7 shows crystal body 1 (AOTF cell) of the present invention improved in this way.

Equivalence Condition in Off-Perpendicular Incidence

FIG. 8 illustrates the vector diagram for determining the equivalence value of the source light incident angle. Referring to FIG. 8, the source light beam $L_1$ in the air is incident on the surface of crystal body 1 at an incident angle $\theta_1$ and separated within crystal body 1 into an ordinary ray and an extraordinary ray. The ordinary ray and the extraordinary ray within crystal body are not traveling in a single direction, (collinear) as in the case of perpendicular incidence. The wavevectors of these rays are denoted by $K_{io}$ and $K_{ie}$.

The incident extraordinary wavevector $K_{ie}$ and the acoustic wavevector $K_{aeo}$ generate the diffracted ordinary wavevector $K_{do}$, and the conservation of momentum requires $$K_{aeo} = K_{ie} - K_{do}.$$

Similarly, the incident ordinary wavevector $K_{io}$ and the acoustic wavevector $K_{aoe}$ generate the diffracted ordinary wavevector $K_{de}$, and the conservation of momentum requires $$K_{aoe} = K_{de} - K_{io}.$$

By the parallel-tangent condition, the angle $\theta_{do}$ of the wavevector $K_{do}$ and the angle $\theta_{de}$ of the wavevector $K_{de}$ are respectively obtained as functions $\theta_{do} = \theta_{do}(\theta_{ie},\lambda)$ and $\theta_{de} = \theta_{de}(\theta_{io},\lambda)$ expressed by the following equations (10) and (11).

$$\tan\theta_{do}(\theta_{ie},\lambda) = \{[(1+\delta)n_o(\lambda)]/[(1-\delta)n_e(\lambda)]\}^2 \cdot \tan\theta_{ie}. \quad (10)$$

$$\tan\theta_{de}(\theta_{io},\lambda) = \{[(1-\delta)n_e(\lambda)]/[(1+\delta)n_o(\lambda)]\}^2 \cdot \tan\theta_{io}. \quad (11)$$

Therefore, the refractive indices $n_{do}$ and $n_{de}$ for the diffracted ordinary ray and the diffracted extraordinary ray are obtained as in equations (1) and (2).

$$n_{do} = n_{do}(\theta_{ie}, \lambda) \qquad (12)$$
$$= \{\cos^2\theta_{do}(\theta_{ie}, \lambda)/[(1-\delta)^2 n_o^2(\lambda)] + \sin^2\theta_{do}(\theta_{ie}, \lambda)/n_o^2(\lambda)\}^{-1/2},$$

$$n_{de} = n_{de}(\theta_{io}, \lambda) \qquad (13)$$
$$= \{\cos^2\theta_{de}(\theta_{io}, \lambda)/[(1+\delta)^2 n_o^2(\lambda)] + \sin^2\theta_{de}(\theta_{io}, \lambda)/n_e^2(\lambda)\}^{-1/2},$$

Then from the conservation-of-momentum condition, the angle $\theta_{aeo}$ and frequency $f_{aeo}$ of the acoustic wavevector $K_{aeo}$ and the angle $\theta_{aoe}$ and frequency $f_{aoe}$ of the acoustic wavevector $K_{aoe}$ are obtained as follows.

$$\tan(\theta_{aeo}) = \qquad (14)$$
$$\tan[\theta_{aeo}(\theta_{ie}, \lambda)] = \frac{n_{ie}(\theta_{ie}, \lambda) \cdot \sin\theta_{ie} - n_{do}(\theta_{ie}, \lambda) \cdot \sin[\theta_{do}(\theta_{ie}, \lambda)]}{n_{ie}(\theta_{ie}, \lambda) \cdot \cos\theta_{ie} - n_{do}(\theta_{ie}, \lambda) \cdot \cos[\theta_{do}(\theta_{ie}, \lambda)]}.$$

$$f_{aeo} = f_{aeo}(\theta_{ie}, \lambda) = (V_a/\lambda_0)\left[n_{ie}^2(\theta_{ie}, \lambda) + \theta_{do}^2(\theta_{ie}, \lambda) - \right. \qquad (15)$$
$$\left. 2n_{ie}(\theta_{ie}, \lambda) \cdot n_{do}(\theta_{ie}, \lambda) \cdot \cos(\theta_{do}(\theta_{ie}, \lambda) - \theta_{ie})\right]^{1/2}.$$

$$\tan(\theta_{aoe}) = \qquad (16)$$
$$\tan[\theta_{aoe}(\theta_{io}, \lambda)] = \frac{n_{io}(\theta_{io}, \lambda) \cdot \sin\theta_{io} - n_{de}(\theta_{io}, \lambda) \cdot \sin[\theta_{de}(\theta_{io}, \lambda)]}{n_{io}(\theta_{io}, \lambda) \cdot \cos\theta_{io} - n_{de}(\theta_{io}, \lambda) \cdot \cos[\theta_{de}(\theta_{io}, \lambda)]}.$$

$$f_{aoe} = f_{aoe}(\theta_{io}, \lambda) = (V_a/\lambda_0)\left[n_{io}^2(\theta_{io}, \lambda) + \theta_{de}^2(\theta_{io}, \lambda) - \right.$$
$$\left. 2n_{io}(\theta_{io}, \lambda) \cdot n_{de}(\theta_{io}, \lambda) \cdot \cos(\theta_{de}(\theta_{io}, \lambda) - \theta_{io})\right]^{1/2}.$$

Here $V_a$ is the acoustic velocity, and $\lambda_o$ is the vacuum wavelength of the incident and diffracted rays.

The equivalence condition for off-perpendicular incidence is obtained by equating the equation (14) with the equation (16) or by equating (15) with (17). This equivalence condition is expressed as a relationship between $\theta_{ie}$ and $\theta_{io}$ for given wavelength $\lambda$. Then using the equations (6) and (7), we can obtain the equivalence value of the source light incident angle $\theta_1$ as a function of the surface angle $\theta_s$ of the crystal body and the optic wavelength $\lambda$, if the equivalence value exists.

Figure 12:
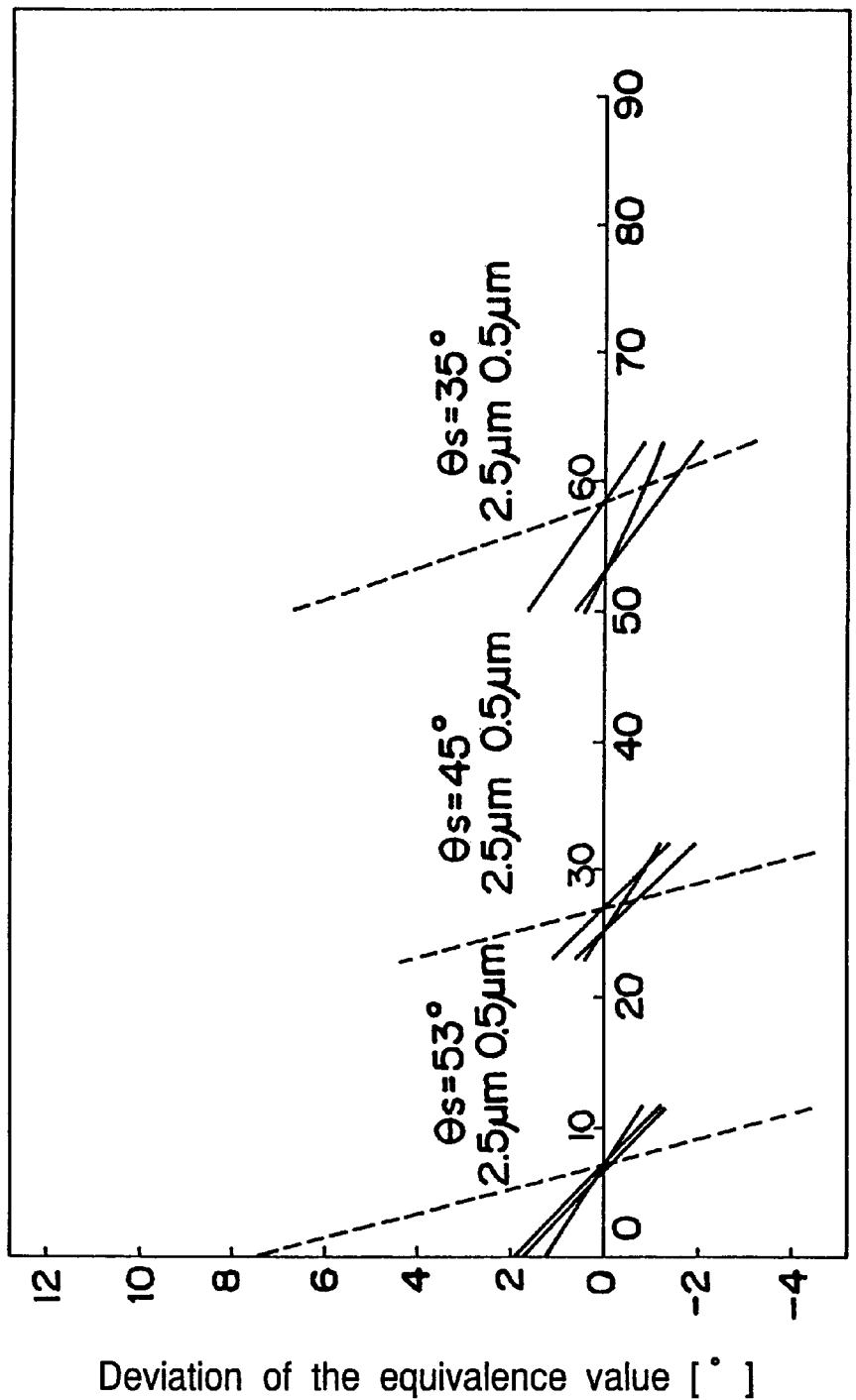
FIG. 12 is a graph illustrating the deviation of the equivalence value of the source light incident angle depending on the optic wavelength, the surface angle of the crystal body, and the source light incident angle.

The numerical computations take considerable time. The computation results show that the equivalence value of the source light incident angle exists, although the difference between the equivalence value of the source light incident angle $\theta_1$ based on the condition on acoustic wavevector angles and the equivalence value of the source light incident angle $\theta_1$ based on the condition on acoustic frequencies becomes slightly greater than the difference of the equivalence incident angles based on the two conditions in perpendicular incidence, in which the equivalence incident angles are approximately $\theta_i=\theta_s=55.9°$. FIGS. 12 and 13 show how the equivalence value of the source incident angle $\theta_1$ varies with the surface angle $\theta_s$ of the crystal body and the wavelength of the light.

The following is a summary of the computation results:

(a) according to the computation results, the difference between the equivalence value of the source light incident angle $\theta_1$ based on $\theta_{aoe}=\theta_{aeo}$ and the equivalence value of the source light incident angle $\theta_1$ based on $f_{aoe}=f_{aeo}$ is very small between 0.025° and 0.09°. In perpendicular incidence, the difference of the equivalent incident angle $\theta_i$ based on $\theta_{aoe}=\theta_{aeo}$ and the equivalence incident angle $\theta_i$ based on $f_{aoe}=f_{aeo}$ is between 0.048° and 0.063°. The dependency of the equivalence value on the wavelength becomes greater as the wavelength becomes smaller. The difference of equivalence values for different wavelengths is about 4.5° in the visible region, so that the equivalence value does not exist in this region. The difference of the equivalence values for $\lambda=2.5$ μm and for $\lambda=1.0$ μm is about 0.1° to 0.9°. The convergence angle of the actual source light incident beam is always greater than 1°, so that the equivalence value is obtained in the near infrared region.

(b) If the surface angle of the crystal body is comparatively small, for example $\theta_s=35°$, then the equivalence value of the off-perpendicular incident angle $\theta_i$ becomes large. In this case, there is a dilemma that the dependency of the equivalence value on wavelength becomes great in the visible region, while the source light beam within the crystal body is narrowed into 65% of that in perpendicular incidence ($\theta_s=55.9°$). Further, if the surface angle of the crystal body is comparatively small, for example $\theta_s=35°$, then there arises another problem that the source light incident angle approaches the Brewster angle, as the surface angle of the crystal body becomes smaller.

(c) If the surface angle of the crystal body is comparatively large, for example, $\theta_s=53°$, then those advantages as the source beam narrowing within the crystal body, effective use of crystal body 1, and the easiness of attaching transducer 2 are not remarkable.

(d) Consequently, the surface angle $\theta_s$ of the crystal body is preferably set at a medium or compromising value, for example, 40° or around this value. In this case, the equivalence value of the source light incident angle $\theta_1$ is roughly calculated by a simplified method as follows. The equivalence incident angle in perpendicular incidence is 55.9°. That means the optic incident angles $\theta_{io}$ and $\theta_{ie}$ are both roughly 55.9°. Therefore, referring to FIGS. 2 and 3, the source light refraction angles of both the ordinary and extraordinary rays are roughly $55.9-\theta_s$. Using the graph illustrated in FIG. 11, the abscissa corresponding to the ordinate $55.9°-40°=15.9°$ is found to be about 38°. Therefore, the equivalence value of the source light incident angle is roughly 38°. This source light incident angle is well apart from the Brewster angle, and makes surface coating easy to reduce the reflectance loss.

Although the present invention has been fully described in connection with the preferred embodiment thereof and the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A non-collinear type acousto-optic tunable filter system comprising:

a crystal body formed of an optically transparent uniaxial crystal material;

an acoustic wave application member that applies an acoustic wave to an acoustic wave input surface of said crystal body; and a light source which radiates a source light beam incident on said crystal body such that the source light beam intersects an acoustic wave propagating within said crystal body so that acoustic frequency wavelength components of an incident ordinary ray and an incident extraordinary ray are diffracted within said crystal body, and are respectively separated into a monochromatic diffracted extraordinary ray and a monochromatic diffracted ordinary ray, said light source radiating said source light beam to have a predetermined receiving angular aperture which is off-perpendicularly incident on the surface of said crystal body at a predetermined source light incident angle between 0° and 90°, where the source light incident angle is defined as the angle between the crystal surface normal and the optic axis of the source light beam.

2. The acousto-optic tunable filter system defined in claim 1, wherein the source light incident angle is set at an equivalence value for which the wavelength of the diffracted ordinary ray and the diffracted extraordinary ray becomes identical for an identical acoustic frequency.

3. The acousto-optic tunable filter system defined in claim 2, wherein the surface angle of said crystal body, defined as the angle between the crystal surface normal and the optic axis of the source light beam, is set at a large predetermined angle for which the dependency of said equivalence value on changes in the wavelength of the diffracted rays is small.

4. The acousto-optic tunable filter system defined in claim 3, wherein the surface angle of said crystal body is around 40°.

5. The acousto-optic tunable filter system defined in claim 4, wherein said source light beam is formed of near infrared light.

6. The acousto-optic tunable filter system defined in claim 5, wherein said uniaxial crystal material is a tellurium dioxide crystal.

7. The acousto-optic tunable filter defined in claim 6, wherein the surface of said crystal body is parallel to the direction in which the energy of the acoustic wave flows.

8. The acousto-optic tunable filter system defined in claim 7, wherein the surface of said crystal body is coated so that the transmittance of the light from the outside of said crystal body into said crystal body is enhanced.

9. The acousto-optic tunable filter system defined in claim 1, wherein a cross-section of said source light beam is narrowed in a predetermined direction within said crystal body to have an elliptical shape.

10. The acousto-optic tunable filter system defined in claim 9, wherein the shape of said crystal body is a function of the source light beam narrowing characteristic of said crystal body.

11. The acousto-optic tunable filter system defined in claim 1, wherein a cross-section of said source light beam is narrowed by said crystal body from a circular shape to an elliptical shape.

12. The acousto-optic tunable filter system defined in claim 11, wherein the shape of said crystal body is a function of the source light beam narrowing characteristic of said crystal body.

* * * * *